Jan. 12, 1965  G. A. ZIPPEL  3,165,104
SUSPENSION FILING SYSTEM FOR FOLDERS
AND OTHER DOCUMENT CONTAINERS
Filed April 19, 1960

INVENTOR.
GEORG ALFRED ZIPPEL
BY
Woodhams, Blanchard & Flynn
ATTORNEYS

United States Patent Office

3,165,104
Patented Jan. 12, 1965

3,165,104
SUSPENSION FILING SYSTEM FOR FOLDERS
AND OTHER DOCUMENT CONTAINERS
Georg Alfred Zippel, Muhlweg, Altdorf,
near Nurnberg, Germany
Filed Apr. 19, 1960, Ser. No. 23,195
Claims priority, application Germany, Apr. 23, 1959,
Z 7,276
4 Claims. (Cl. 129—16.7)

This invention relates to suspension filing systems, and more specifically to a suspension filing system for folders and other document containers. The document containers have an upper suspension edge extending in normal suspended position parallel to the ground. A fitting is mounted on the suspension edge and it has a recess opening through said suspension edge. The fitting has two carrier noses projecting into said recess and spaced from the vertical center of gravity of each respective folder for suspending it on a supporting rail. Counter abutment means are provided on the recess and on the rail to prevent pivoting of the fitting relative to the supporting rail.

The document containers capable of being suspended in this manner are known as suspension folders, envelopes and wrappers. The supporting rail and each suspension edge cooperating therewith are constructed in a great variety of ways. All constructions have, however, one feature in common, namely that each folder suspended solely by a single carrier nose will assume with its suspension edge an inclined position to the ground, because the vertical center of gravity of each folder does not pass through the center of gravity of the supporting surface between the carrier nose and the supporting rail but is at a predetermined distance therefrom. As a result the torque moment is produced serving to pivot the folder about the supporting rail as pivot axis, the magnitude of which torque moment is dependent upon the amount of document material inserted or filed in the folder.

In order, therefore, to compel the suspension edges of all folders in a suspension filing cabinet apparatus to assume a position parallel to the ground, that is, a horizontal position, a special holding arrangement has been provided by means of which every suspension edge is supported so that the suspension edge is in the required horizontal position. This special arrangement has likewise been constructed in many ways. All have, however, the common feature that an additional supporting bar is coordinated with the supporting rail engaging under the supporting nose, on which bar each folder is either suspended by means of a second nose extending over the recess so that the suspension edge is parallel to the ground, or against which the back portion of each suspension edge, swinging upwards in relation to the supporting nose, bears in its position parallel to the ground. The supporting bar may be constructed as a separate element or as a component of the supporting rail. This special arrangement ensures in any case that the suspension edges extend parallel to the ground or horizontally, when the folders are in normal suspended state.

It has, however, been found that in a suspension filing cabinet apparatus, when the material filed in a folder is displaced in the direction of the special arrangement holding the supension edges in horizontal position, the unbalance is so great that a counter moment is produced which can become greater than the torque moment pressing each suspension edge of a folder against the special holding arrangement. Also, in the case of folders with one carrier nose and one supporting nose resting on the supporting rail, one of the noses can lift itself off the supporting rail, according to which end of the folder the material is displaced toward. Due to the counter moment, the suspension edges are brought into a position inclined with respect to the ground which prevents a clear view of the suspension filing system, especially when the suspension edges are constructed at the same time as tabs or as guides for other identification marks. A displacement of the filed document material occurs, particularly in the case of suspended envelopes which serve for receiving unperforated material which in all sizes is mostly placed only in the same position into the suspended envelopes.

As compared with the prior art practices, the object of the present invention is to improve suspension devices of the type referred to in such a manner that the horizontal position of a folder in normal suspended position is ensured practically independently of the position and the direction of the vertical center of gravity of this folder.

This object is achieved according to the invention by providing a suspension filing system of the type referred to, which counter abutment means between said supporting rail and said fitting of said folder to take up also the counter torque moment caused by the displacement of the document material in said folder towards said holding arrangement taking up the torque moment, and each fitting also permitting the folder to be easily removed from the supporting rail when desired.

These measures ensure that each suspension edge of a suspended folder, envelope, wrapper or the like will be suspended on the supporting rail parallel to the ground independently of the direction or displaced position of the vertical center of gravity caused by the displacement of the filed material. In particular, this advantage is rendered possible practically without any special construction being necessary, so that the suspension filing system is not more expensive than the constructions hitherto known wherein only the torque moment is taken up.

Several preferred embodiments of the invention are diagrammatically disclosed by way of example in the attached drawings, in which.

Figure 1:
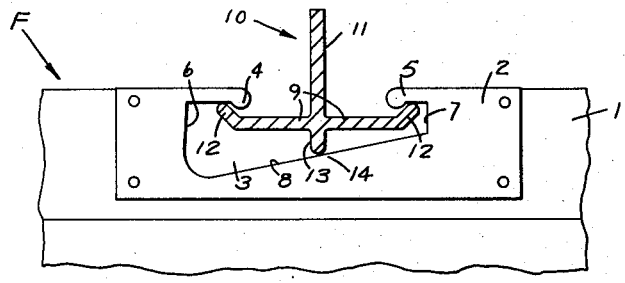
FIGURE 1 is a central sectional view through a supporting rail and showing a fragment of a document folder, including the suspension fitting, mounted on the rail.

In the form of construction illustrated in FIG. 1, the folder F has an upper suspension edge portion 1 which is provided in a known manner with a fitting 2. The fitting 2 has a recess 3 which opens through the upper edge of the folder. Two noses 4 and 5 project partly over the mouth of this recess, the nose 4 being a carrier nose and the nose 5 a supporting nose, because the vertical center of gravity of the folder is located nearer the carrier nose 4. A boundary edge 6 of the recess 3 extends outwardly from the root of the carrier nose 4 at an incline thereby widening the recess, whereas a boundary edge 7 extends from the root of the supporting nose 5 perpendicularly to the suspension edge and is of a length shorter than that of the boundary edge 6. The two boundary edges 6 and 7 are interconnected by an inclined edge 8. The carrier nose 4 and the supporting nose 5 rest on flanges 9 of a supporting rail 10 which is of inverted T-shaped cross-sectional configuration, that is, the noses rest on the free longitudinal edges, of the rail which edges are bent or beaded upwards towards the web 11 of the supporting rail so that inclined surfaces 12 are formed. The free ends of the carrier nose 4 and the supporting nose 5 are widened and rounded. The widened portions bear against the inclined surfaces 12 to hold the suspension edge 1 and, consequently, the document container or folder F associated therewith, in a central position between the inclined surfaces 12 of the supporting rail 10. The spacing between the boundary edges 6 and 7 of the recess 3 is greater than the width of the supporting rail so that the folder can be lifted off the supporting rail swinging the carrier nose 4 upwardly and at the same time pushing it forward towards the web 11 of the supporting rail 10 to disengage nose 5 from the rightward surface 12. The folder can then be swung so that the nose 5 moves downwardly below the supporting rail 10. Then folder can be moved leftwardly with respect to the supporting rail as shown in FIGURE 1 until those 4 is clear of the leftward surface 12.

Figure 5:
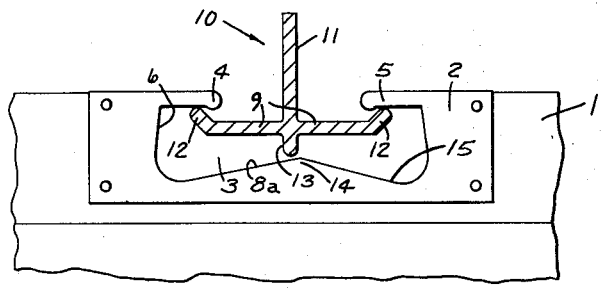
FIGURE 5 is a view similar to FIGURE 1 of still another modification.

According to the invention an abutment 13 constructed as a longitudinal rib, bar or the like is provided as a downward extension of the web 11 of the supporting rail 10. The abutment 13 bears against the inclined bottom edge 8 of the recess 3 almost without play when the folder is in the normal suspended position as shown in FIG. 1. The inclined edge 8 forms a counter abutment 14 for the abutment 13 at the point of contact therebetween. If the document material in the folder is displaced toward one end or the other, the carrier nose 4 or the supporting nose 5 associated with the respective opposite end, will be urged upwardly away from the bent up longitudinal edge of the associated flange 9. This, however, is prevented by the abutment 13 and the counter abutment 14. Moreover, since the spacing between the boundary edges 6 and 7 is greater than the width of the rail 10, a positive shifting and swinging of the suspension edge can be effected, so that, in spite of the abutment 13 and the counter abutment 14, the folder can be suspended on or lifted off the supporting rail 10 without any hindrance as above described. In FIG. 5, there is shown a modification in which the recess 3 is constructed symmetrically with the portions 8a and 15 of the bottom edge of the recess being oppositely inclined. This modification is advantageous because it permits the folder to be suspended on or lifted off the supporting rail 10 from both sides of the supporting rail.

Figure 4:
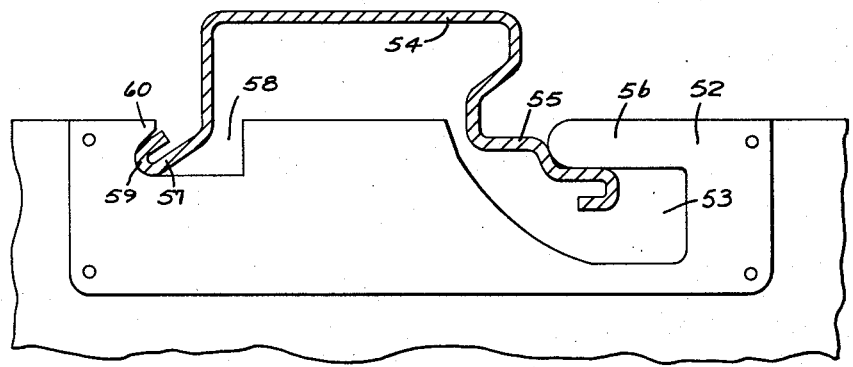
FIGURE 4 is a view similar to FIGURE 1 of yet another modification.

In the form of construction illustrated in FIG. 4 the suspension system has a supporting rail 54 of substantially U-shaped cross-section. The longitudinal edges of the two flanges are outwardly bent. Hereby one of the bent longitudinal edges forms a substantially horizontal supporting rail arm 55 offset in stepped form. A carrier nose 56 of the fitting 52 rests on the lowermost step thereof when the folder is in normal suspended position. The outwardly bent longitudinal edge of the other supporting rail flange forms a supporting nose 57 for the torque moment resulting from the normal position of the vertical center of gravity of the folder, which moment urges the suspension edge 1 against the supporting nose 57 with a point on the supporting rail arm 55 serving as pivot axis. The supporting nose 57 has a reversely bent boundary edge 59 projecting into an inclined undercut of a recess 58 in the fitting 52. The boundary edge 59 forms an abutment for the counter moment which is taken up by the extension 60 projecting over the undercut portion of the recess 58 and acting as a counter abutment. The supporting nose 57 has so much play in the recess 58, and the supporting rail arm 55 has so much play in the recess 53 in the longitudinal direction of the suspension edge 1, that the edge 59 and the extension 60 can be separated by longitudinally shifting the suspension edge in the direction of the carrier nose 56 so that the folder may be taken off the supporting rail 54.

Figure 2:
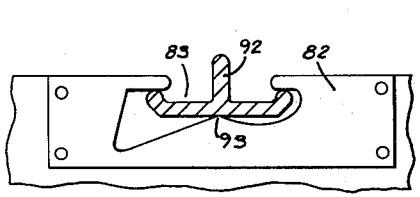
FIGURE 2 is a view similar to FIGURE 1 of a modification.

In the embodiment according to FIG. 2 the fitting has, in a known manner, a recess 83 whose open side is narrower than the width of a supporting rail 92. In a suspension system of this type the vertical center of gravity of the folder passes between the two contacting noses of the recess, preferably towards the nose on the left in the drawing. When the folder carries a normal load and the document material is suspended in a normal manner in its folder, the two noses will rest more or less uniformly on the bent up ends of the supporting rail 92. In this position the fitting would, in the event of the weight being displaced, continue to bear with one nose, whereas the other nose would lift itself off the supporting rail 92, with the result that an inclined position would automatically occur. To prevent this, the recess 83 in the fitting 82 is provided with a nose 93 which bears against the lower edge of the supporting rail which is here, by way of example, of T-shaped cross-section.

Figure 3:
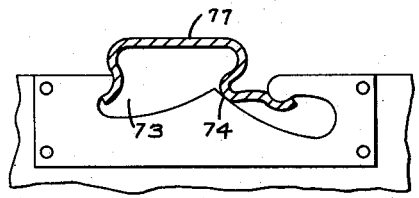
FIGURE 3 is a view similar to FIGURE 1 of another modification.

The construction according to FIG. 3 is again a suspension device in which the vertical center of gravity of the folder is located outside the recess 73 and the counter torque moment is taken up by the nose 74 of a supporting rail 77.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:
1. A suspension type filing device, comprising:
an elongated and rigid supporting rail of uniform cross-section having first and second parallel flange means extending along the opposite lengthwise sides thereof and projecting in opposite sideward directions;
a folder fabricated from sheet material and having an upper suspension edge portion;
a substantially flat and stiff suspension member secured to said suspension edge portion, said member having a recess opening through the upper edge thereof, said recess being defined by a bottom edge, a pair of spaced, side edges, and a pair of carrier noses extending toward each other from the upper ends of said side edges, the distance between said carrier noses being less than the distance between the remote edges of said flange means, said rail being relatively movable transversely thereof into said recesses and into a position with respect thereto so that said noses are respectively engaged by and supported upon said flange means, the distance between at least a portion of one side edge and the one carrier nose adjacent the opposite side edge of said recess being greater than said distance between said remote edges of said flange means on said rail;
first abutment means on the lower surface of said rail and extending lengthwise thereof between said flange means;
second abutment means on the bottom edge of said recess and spaced from said side edges, said second abutment means including a projection extending upwardly from the bottom edge of said recess between said carrier noses for engaging the lower side of said supporting rail, said rail being spaced from said bottom edge on both sides of said second abutment means, said first and second abutment means being in contact with each other when said flange means are in supporting positions beneath said carrier noses, whereby pivoting of said suspension member and said folder around the lengthwise axis of said rail is positively opposed, said bottom edge of said recess having one portion between said second abutment means and said one side edge, which portion is below said second abutment means and is spaced a substantial distance from the flange means when it is in said supporting position, said rail being relatively movable within said recess from said supporting position toward said one side edge so that said first abutment means is moved away from said second abutment means and the flange means is moved from beneath the one carrier nose, whereby said folder can be moved downwardly away from said rail.

2. A suspension type filing system according to claim 1, in which said one portion of the bottom edge of said recess is inclined upwardly from said one side edge of said recess to said projection and another portion of said bottom edge is inclined downwardly from said projection toward the other side edge of said recess.

3. A suspension type filing system according to claim 1, in which said one portion of said bottom edge is straight and said another portion is concavely curved.

4. A suspension type filing system according to claim 2, in which both said one portion and said another portion of said bottom edge are straight.

References Cited by the Examiner

UNITED STATES PATENTS 1,922,736  8/33  Johnston et al.
2,483,046  9/49  Heckert.

FOREIGN PATENTS 198,230  6/58  Austria.
751,152  6/56  Great Britain.
964,584  5/59  Germany.

JEROME SCHNALL, *Primary Examiner.*

GEORGE A. NINAS, JR., *Examiner.*